E. G. BAILEY.
METHOD OF OBTAINING A READY COMPARISON OF FACTORS IN A POWER PRODUCING OR USING APPARATUS.
APPLICATION FILED MAR. 3, 1921.
Reissued Apr. 12, 1921. 15,080.
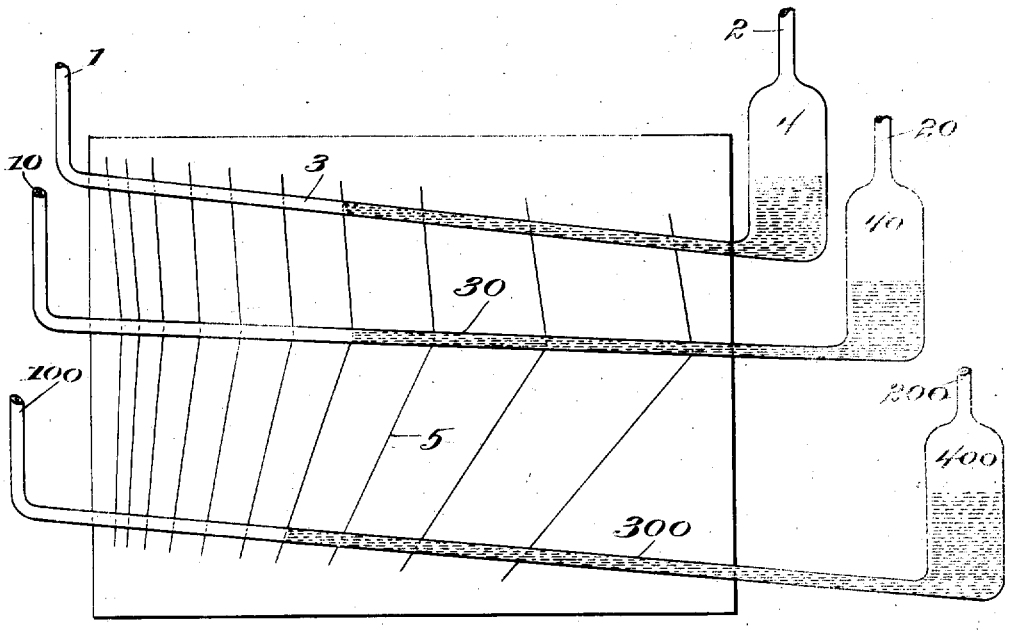
Witnesses:
Jas J. Maloney.
W. E. Lowry
Inventor:
Erwin G. Bailey,
by H. J. Swinnerton
Atty.

UNITED STATES PATENT OFFICE.

ERVIN G. BAILEY, OF NEWTON HIGHLANDS, MASSACHUSETTS, ASSIGNOR TO BAILEY METER COMPANY, A CORPORATION OF MASSACHUSETTS.

METHOD OF OBTAINING A READY COMPARISON OF FACTORS IN A POWER PRODUCING OR USING APPARATUS.

15,080. Specification of Reissued Letters Patent. Reissued Apr. 12, 1921.

Original application filed February 24, 1913, Serial No. 750,069. Renewed August 24, 1917, Serial No. 188,068. Original No. 1,257,964, dated March 5, 1918. Application for reissue filed March 3, 1921. Serial No. 450,033.

*To all whom it may concern:*

Be it known that I, ERVIN G. BAILEY, a citizen of the United States, residing in Newton Highlands, in the county of Middlesex and State of Massachusetts, have invented an Improvement in Methods of Obtaining a Ready Comparison of Factors in a Power Producing or Using Apparatus, of which the following description, in connection with the accompanying drawings, is a specification, like letters on the drawings representing like parts.

The present invention relates to a method of obtaining a ready comparison of two or more differently varying active factors in a power producing or using apparatus with a view of adjusting one or more of said factors in order to secure the condition of desired efficiency at all rates of output.

The flow of air to support combustion, the flow of steam and the flow of the products of combustion in the case of a steam boiler plant, the flow of fluids in a turbine, engine or pump, the flow of electricity (which for the purpose of my invention may be regarded as a fluid) in an electric generator, or in an electric motor, the flow of liquid fuel or of gaseous fuel to a power generator, the pressures of such fluids, the speed of the moving parts of such an apparatus and the heat of fluids in such an apparatus are examples of what I regard as active factors of a power producing or using apparatus within the scope of my invention.

In any particular piece of apparatus the factors which are active therein vary throughout the range of output of the apparatus at rates which are different from one another and the same factors in different forms of the same kind of apparatus vary at different rates. It is therefore impossible to construct in advance any indicator which will give a ready comparison of the active factors in such a way that any departure in their relation from that corresponding to the condition of desired efficiency may be indicated at all rates of output. But I have found that by making an empirical determination of the relative value of said factors throughout the rates of output of the apparatus at the desired efficiency, I can then associate, according to said empirical determination, movable mechanical elements upon which the factors act and a common standard of comparison so as to make an observable presentation of any departure in the relation of said factors from the relation which I have found to exist when there is a condition of desired efficiency, at all rates of output.

In a particular steam generating apparatus, for example, if solid fuel is used, there is a relation between the drop in pressure due to resistance of the fuel bed and the rate of flow of the gases through the fuel bed, which relation must be maintained whatever may be the output of the apparatus in order to operate it at the desired efficiency. This relation is determinable only by testing the apparatus and may and generally does vary throughout the range of its output at the desired efficiency. There is also a similar relation between the rate of flow of air and the rate of flow of steam, which relation can be found by comparing some factor, such as a pressure difference, which is a function of the rate of flow of steam, with a similar factor which is a function of the rate of flow of air. If gaseous or liquid fuel is used, there is a similar relation between the rate of flow of the gas or liquid and the rate of flow of air supplied to complete the combustion. There is also a similar relation between the temperature of the flue gases and the rate of heat generation. Any departure in the relation of these active factors from that corresponding to the condition of desired efficiency indicates that there is some defect in the handling or adjustment of the apparatus which ought to be remedied.

In the case of a steam operated electric generator, there is a similar relation between the amount of steam used and the amount of current generated.

In fact, in all known forms of apparatus for generating or utilizing power, certain variable active factors are essential to the operation of the apparatus, and these factors bear certain relations to each other which can be empirically determined when the desired conditions of efficiency exist throughout the range of output.

In carrying out the method in which my invention consists I test the apparatus in question to make an empirical determination by any known methods, such as pressure measurement, gas analysis, etc., of the relative value of the factors, above described, when the apparatus is in the condition of the desired efficiency throughout the range of output. I cause each factor to act upon a movable mechanical element. Each factor may act upon one element or two factors may act upon the same element. The elements acted upon may or may not be the same as the devices which are acted upon by the factors in the testing of the apparatus. I then associate the element or elements acted upon by the factors with a common standard of comparison according to the empirical determination of the relative value of the factors in such a way as to make an observable presentation of any departure in the relation of the factors from the relation which has been found to exist when the condition is that of desired efficiency at all rates of output. I am thus able to obtain an indicator which tells by a ready comparison while the apparatus is in practical every day use, whether or no there is any deviation from such a determined relation. In the practical application of the method indicators which respond in their operation to the pressure differences or other factors, are so arranged with relation to each other, or so converted into a single indicator as to indicate visually any deviation from the previously ascertained relation between the factors.

In order that the method and the utility thereof may be most easily understood, I have chosen, as an illustration, the method of showing the condition of a steam generating apparatus in which solid fuel is used. In connection with such an apparatus, it may be stated that when fuel of a certain character and quality is used for a given purpose, a definite amount of air should be used per pound of fuel to produce the most efficient combustion; and each pound of fuel so used should cause the generation of a definite quantity of steam. Each unit of air supply, therefore, should result in the generation of a definite amount of steam at a given rate of steam generation when the furnace and boiler are in the condition of the desired efficiency. A relation, therefore, exists between the rate of flow of air and the rate of flow of steam when such is the case which is so complex, that it can not be determined throughout the range of output of the apparatus, except empirically.

In carrying out my invention, it is practicable to connect movable indicating members, preferably arranged in proximity to each other or otherwise associated, with the several souces of pressure so that the members will be acted upon by the pressures in such a way that the positions of the members will vary, respectively, as some function of the rate of steam generation from the boiler, the rate of air supply to the furnace, and the condition of the fuel bed. I then test the apparatus to determine empirically the relative positions of the several indicating members for various rates of output at the desired efficiency. I then modify and readjust one or more of the indicating members, or graduate a scale forming a common standard of comparison, to show their positions, or that of the indicators of any equivalent indicating device I may desire to use, and thereby associate them so that one can readily observe whether or not the furnace conditions and other conditions are as they should be to obtain the desired efficiency. Moreover, the arrangement is such that if the conditions are not as they should be, one can readily note what changes should be made. For a better understanding of the practical application of my method, I have herein shown a simple device which can be utilized to advantage.

The drawing is a front elevation of such a device.

Referring to the drawing, the device consists of three separate modified U-tubes 4, 40 and 400, of known type, suitably arranged or associated for ready comparison of the positions of the several columns of liquid in the tubes. The branches 1 and 2 of the U-tube 4 are connected to a Pitot tube, Venturi tube, or similar device in the steam pipe through which the steam generated in a boiler passes, so that a motion of the indicating liquid in leg 3 will respond to any change in the rate of flow of steam. Connections 10 and 20 likewise communicate with a Pitot tube or similar device in the air or gas passage to or from the furnace, or as is usually most convenient, connect, respectively, by direct connections into the said gas passage at a point where the gases enter and at a point where the gases leave the boiler setting, so that a pressure difference is obtained which varies as some function of the rate of flow of air through the furnace or boiler setting, any variation in which pressure difference is indicated by motion of the indicating liquid in leg 30. Pipes 100 and 200 are connected below and above the fuel bed, respectively, and the motion of the indicating liquid in the leg 300 will be caused by variations in the drop in pressure across the fuel bed. This drop in pressure across the fuel bed varies both as the rate of flow of air through the fuel bed and as the resistance or condition of said fuel bed, and a comparison of the drop in pressure due to the resistance of the fuel bed with the difference between the pressure of the gases entering the boiler setting and the pressure of the gases leaving the boiler setting, or some substantially constant resistance in series with the fuel bed gives a reliable indication of the condition of the fuel bed independently of the rate of flow of air through said fuel bed. By properly connecting the U-tube gages, as described, one step of the method is accomplished.

I test the apparatus to determine empirically the existing conditions at any time by various tests of weight of coal burned, gas analysis, etc., and, from such data, I determine what positions of the indicators in tubes 30 and 300 should correspond to various positions of the indicator in the tube 3 under conditions of the desired efficiency. After these facts are determined, I associate the indicators in tubes 3, 30, and 300 and a common standard of comparison by graduating a scale 5, according to the positions of the indicators in the tubes at several rates of output when the apparatus is working at the desired efficiency. I thus obtain an indicator giving a ready comparison of any departure, in the relation of the air and steam flows and in the resistance of the fuel bed, from the condition of desired efficiency, by showing whether or not all the indicating members (in this case the ends of the columns of liquid) are on the same graduation of said scale. Therefore, when the furnace is in operation, if the indicating members are not on the same graduation it shows that changes should be made in the fuel bed or draft regulations to make the conditions right. For instance, if the indicator in tube 3 registers with a certain graduation, and the indicator in tube 30 is above that graduation, and the indicator in tube 300 is below that graduation, it indicates that there is more air passing through the furnace than should be required to generate steam economically at the rate at which it is being generated, and that this is caused because the resistance of the fuel bed is too low, and the fuel bed too thin. Or, if the indicators in tubes 30 and 300 register with the same graduation while the indicator in tube 3 is below that graduation, it shows that too much air is being supplied, although the fuel bed has the right average resistance. This reading shows that the fuel bed is too thick in some parts of the grate and too thin in others, and that it should be leveled in order to utilize the air more effectively.

In the above description, the pressure differences which are functions of the rates of flow and fuel bed resistance, are the varying active factors, and are utilized to operate the movable elements. Furthermore, the U-tube gages and the graduated scale have been chosen as an illustration on account of the simplicity of this device as a means for completing the invention.

In cases, however, where pressure differences are not alone available for the purpose of operating the movable elements as in the case of a steam operated electric generator, a movable element, the position of which varies with variations in the current output (for example, the pointer of an indicating watt-meter) can be associated with an indicating steam meter. In a similar way, a thermometer can be used when variable temperature is one of the factors. In all these cases the method of showing any departure from economical conditions is the same.

The invention, therefore, is capable of wide and varying uses, and does not depend in any way upon the use of any specific instrument or device.

What I claim is:

1. The method of obtaining a ready comparison of two or more differently varying active factors in a power producing or using apparatus with the view of adjusting one or more of said factors in order to secure the condition of desired efficiency at all rates of output, which consists in testing said apparatus to make an empirical determination of the relative value of said factors throughout the range of output of the apparatus at the desired efficiency, causing each of said factors to act upon a corresponding movable mechanical element, and associating said elements upon which the factors act and a common standard of comparison according to said empirical determination to make an observable presentation of any departure in the relation of the said factors from that corresponding to the condition of desired efficiency at all rates of output.

2. The method of obtaining a ready comparison of the rates of flow of two or more fluids in a power producing or using apparatus with a view of adjusting the rate of flow of one or more of said fluids in order to secure the condition of desired efficiency at all rates of output, which consists in testing said apparatus to make an empirical determination of the relation of the rate of flow of one fluid to the rate of flow of another fluid throughout the range of output of the apparatus at the desired efficiency, causing forces each of which is a function of one of said rates of flow to act upon a corresponding movable mechanical element, and associating said elements upon which the forces act and a common standard of comparison according to said empirical determination to make an observable presentation of any departure in the relation of the rates of flow of said fluids from that corresponding to the condition of desired efficiency at all rates of output.

3. The method of obtaining a ready comparison of the rates of the flow of air and steam in a steam generating apparatus with the view of adjusting the rate of flow of one or the other of said fluids in order to secure the condition of desired efficiency at all rates of output, which consists in testing said apparatus to make an empirical determination of the relation of the rate of flow of air to the rate of flow of steam throughout the range of output of the apparatus at the desired efficiency, causing a force which is a function of the rate of flow of air and a force which is a function of the rate of flow of steam, each to act upon a movable mechanical element, and associating each element upon which the forces act and a common standard of comparison according to said empirical determination to make an observable presentation of any departure in the relation of the rates of flow of said air and steam from that corresponding to the condition of desired efficiency at all rates of output.

4. The method of obtaining a ready indication of the resistance of the fuel bed to the passage of air therethrough in a furnace using solid fuel with a view of stoking the fire, which consists in testing said furnace to make an empirical determination of the relation of the drop in pressure across the fuel bed and the rate of flow of gases through said fuel bed throughout the range of output of heat energy of the furnace at the desired resistance of the fuel bed, causing forces which are respectively functions of said drop in pressure and of said rate of flow each to act upon a movable mechanical element, and associating each element upon which the forces act and a common standard of comparison according to said empirical determination to make an observable presentation of any departure in the resistance of the fuel bed from that corresponding to the desired resistance at all rates of output of heat energy.

5. The herein described method of showing at all times any departure from the condition of best efficiency in a power producing apparatus, which method consists in testing said apparatus to determine empirically at each and every rate of output throughout the range of operation of the apparatus the relation then existing between certain active factors; and causing said active factors to operate visual indicating devices in such a way that said indicating devices show at all times and at every rate of output, the existence or non-existence of a relation between said factors which should exist at the existing rate of output.

In testimony whereof, I have signed my name to this specification in the presence of two subscribing witnesses.

ERVIN G. BAILEY.

Witnesses:
M. E. Coveney,
James J. Maloney.